United States Patent
Sim et al.

(10) Patent No.: US 11,711,540 B2
(45) Date of Patent: *Jul. 25, 2023

(54) METHOD FOR ENCODING VIDEO USING EFFECTIVE DIFFERENTIAL MOTION VECTOR TRANSMISSION METHOD IN OMNIDIRECTIONAL CAMERA, AND METHOD AND DEVICE

(71) Applicant: GOLDENWAVEPARTNERS CO., LTD., Gimpo-si (KR)

(72) Inventors: Donggyu Sim, Seoul (KR); Seanae Park, Seoul (KR)

(73) Assignee: GOLDENWAVEPARTNERS CO., LTD., Gimpo-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,678

(22) Filed: Dec. 16, 2021

(65) Prior Publication Data

US 2022/0109869 A1 Apr. 7, 2022

Related U.S. Application Data

(63) Continuation of application No. 17/100,117, filed on Nov. 20, 2020, now Pat. No. 11,218,725, which is a
(Continued)

(30) Foreign Application Priority Data

Nov. 22, 2016 (KR) .................. 10-2016-0155541

(51) Int. Cl.
*H04N 19/46* (2014.01)
*H04N 19/139* (2014.01)
(Continued)

(52) U.S. Cl.
CPC ......... *H04N 19/521* (2014.11); *H04N 19/139* (2014.11); *H04N 19/44* (2014.11); *H04N 19/46* (2014.11); *H04N 19/513* (2014.11)

(58) Field of Classification Search
CPC ........ H04N 19/44; H04N 19/46; H04N 19/52; H04N 19/55; H04N 19/105; H04N 19/139;
(Continued)

(56) References Cited

U.S. PATENT DOCUMENTS 7,623,682 B2 11/2009 Park et al.
9,137,546 B2 * 9/2015 Won ...................... H04N 19/61
(Continued)

FOREIGN PATENT DOCUMENTS

CN 101002479 A 7/2007
CN 101010960 A 8/2007
(Continued)

OTHER PUBLICATIONS

Kwangwoon University Industry, International Search Report, PCT/KR2016/013592, dated Aug. 16, 2017, 18 pgs.
(Continued)

*Primary Examiner* — Tsion B Owens
(74) *Attorney, Agent, or Firm* — Sughrue Mion, PLLC

(57) ABSTRACT

The present invention relates to an image encoding and decoding technique for a high-definition video compression method and device for an omnidirectional security camera, and more specifically, to a method and a device whereby a differential motion vector is effectively transmitted, and an actual motion vector is calculated using the transmitted differential motion vector, and thus motion compensation is performed.

6 Claims, 11 Drawing Sheets

Related U.S. Application Data continuation of application No. 16/418,738, filed on May 21, 2019, now abandoned, which is a continuation of application No. PCT/KR2016/013592, filed on Nov. 24, 2016.

(51) Int. Cl.
*H04N 19/513* (2014.01)
*H04N 19/44* (2014.01)

(58) Field of Classification Search
CPC .. H04N 19/176; H04N 19/513; H04N 19/521; H04N 19/597
See application file for complete search history.

(56) References Cited

U.S. PATENT DOCUMENTS

| | | | |
|---|---|---|---|
| 10,999,598 B2* | 5/2021 | Park | H04N 19/124 |
| 2006/0034529 A1 | 2/2006 | Park et al. | |
| 2006/0034530 A1 | 2/2006 | Park | |
| 2009/0279608 A1 | 11/2009 | Jeon et al. | |
| 2009/0296811 A1 | 12/2009 | Jeon et al. | |
| 2011/0222602 A1* | 9/2011 | Sung | H04N 19/597 |
| | | | 375/E7.243 |
| 2012/0263235 A1 | 10/2012 | Sugio et al. | |
| 2013/0195185 A1 | 8/2013 | Lee et al. | |
| 2014/0092977 A1 | 4/2014 | Lainema et al. | |
| 2015/0016531 A1* | 1/2015 | Hannuksela | H04N 19/33 |
| | | | 375/240.16 |
| 2015/0170399 A1 | 6/2015 | Li et al. | |

FOREIGN PATENT DOCUMENTS

| | | |
|---|---|---|
| KR | 10-2008-0008944 A | 1/2008 |
| KR | 20080015760 A | 2/2008 |
| KR | 10-2013-0089140 A | 8/2013 |
| KR | 10-2014-0135116 A | 11/2014 |
| KR | 10-2015-0063135 A | 6/2015 |

OTHER PUBLICATIONS

Office Action dated Aug. 11, 2022 issued in Chinese Application No. 201680091033.9.
Office Action dated Jan. 13, 2023 in Chinese Application No. 201680091033.9.

* cited by examiner

METHOD FOR ENCODING VIDEO USING EFFECTIVE DIFFERENTIAL MOTION VECTOR TRANSMISSION METHOD IN OMNIDIRECTIONAL CAMERA, AND METHOD AND DEVICE

RELATED APPLICATIONS

This is a continuation of U.S. application Ser. No. 17/100,117 filed Nov. 20, 2020, which is a continuation of U.S. application Ser. No. 16/418,738 filed May 21, 2019, which is a continuation application of the International Patent Application Serial No. PCT/KR2016/013592, filed Nov. 24, 2016, which claims priority to the Korean Patent Application Serial No. 10-2016-0155541, filed Nov. 22, 2016. Both of these applications are incorporated by reference herein in their entireties.

TECHNICAL FIELD

The present invention relates to an image encoding and decoding technique in a high-quality video compression method and apparatus for an omnidirectional security camera. And more particularly, the present invention relates to a method and apparatus for efficiently transmitting a differential motion vector, calculating an actual motion vector through a transmitted differential motion vector, and thereby performing motion compensation.

BACKGROUND

In recent years, there has been a growing demand for a variety of devices and systems for security, due to increasing social anxiety due to crime such as indiscriminate crimes against unspecified persons, retaliatory crimes against certain targets, and crimes against socially vulnerable classes. In particular, security cameras (CCTV) can be used as evidence for crime scenes or impression descriptions of criminals, thus demand for personal safety as well as national demand is increasing. However, due to the limited conditions in transmission or storage of acquired data, image quality deteriorates or there is a real problem that can be saved as a low-quality image. In order to utilize a variety of security camera images, a high-quality compression method capable of storing a high-quality image with a low data amount is required.

In most image compression, since the encoding/decoding efficiency is improved through the compression between images, various inventions that effectively compress the images are proposed. An effective motion vector transmission technique is an important technique for improving inter prediction performance.

SUMMARY

An object of Some embodiments of the present invention is to effectively compress image data acquired via an omnidirectional security camera.

It is to be understood, however, that the technical problems of the present invention is not limited to the above-described technical problems, and other technical problems may exist.

As a technical mean for achieving the above object, an apparatus and method for decoding an image according to an embodiment of the present invention adaptively sets a prediction candidate of a motion vector to an image using a virtual motion vector, and performs motion compensation after calculating an actual motion vector using the prediction candidate and a transmitted differential motion vector. To this end, an embodiment of the present invention includes a parsing unit for parsing image information and camera information, an information acquisition unit for calculating and predicting image information using parsed information, a virtual coordinate determination unit for determining a virtual image coordinate system using image information, a motion vector prediction candidate setting unit for setting a motion vector prediction candidate in a virtual coordinate, a virtual motion vector calculation unit for calculating a virtual motion vector by using a predictive motion vector and a transmitted differential motion vector, a motion vector conversion unit for converting the virtual motion vector into an actual motion vector in an image, and a motion compensation performing unit for performing motion compensation using an actual motion vector.

In order to improve inter prediction coding efficiency, the present invention determines a virtual coordinate by reflecting characteristics of an image, calculates a virtual motion vector using a predictive motion vector and a differential motion vector in a virtual coordinate, and then performs motion compensation.

DETAILED DESCRIPTION

Figure 1:
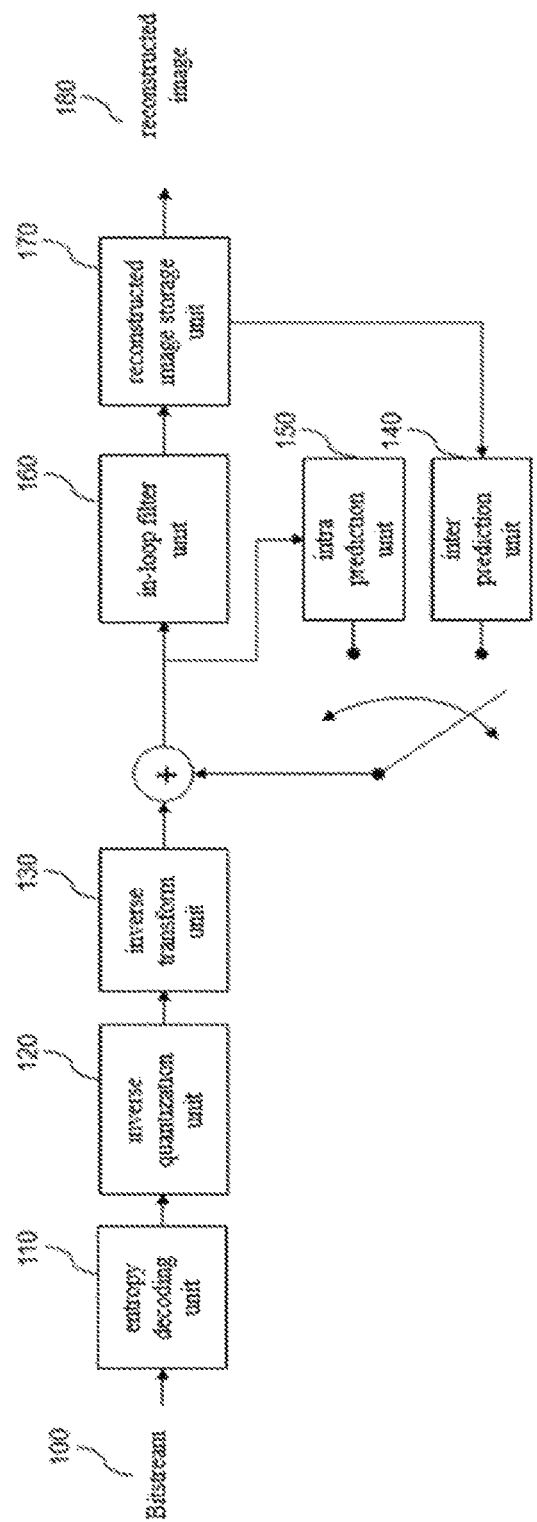
FIG. 1 is a block diagram showing a configuration of a video decoding apparatus according to an embodiment of the present invention.

Hereinafter, embodiments of the present invention will be described in detail with reference to the drawings attached hereto, so that those skilled in the art can easily carry out the present invention. The present invention may, however, be embodied in many different forms and should not be construed as limited to the embodiments set forth herein. In order to clearly illustrate the present invention, parts not related to the description are omitted in the drawings, and similar parts are denoted by similar reference numerals throughout the specification.

Throughout this specification, when a part is referred to as being 'connected' to another part, it includes not only a case where it is directly connected but also a case where the part is electrically connected with another part and there are other devices in between. In addition, in the specification, when an element is referred to as being "comprising" an element, it is understood that the element may further comprise other elements without excluding other elements as long as there is no contrary description.

The term "~ step" or "step of ~" used in the present specification does not imply a step for ~.

Also, the terms such as first, second, etc. may be used to describe various components, but the components should not be limited by the terms. The terms are used only for the purpose of distinguishing one component from another.

In addition, the components shown in the embodiments of the present invention are shown independently to represent different characteristic functions, and it does not mean that each component is composed of separate hardware or one software constituent unit. That is, each constituent unit is described separately for convenience of explanation, and at least two constituent units of constituent units may be combined to form one constituent unit or one constituent unit may be divided into a plurality of constituent units to perform a function. The integrated embodiments and the separate embodiments of each of these components are also included in the scope of the present invention without departing from the essence of the present invention.

First, the terms used in the present application will be briefly described as follows.

The video decoding apparatus may be a device included in the server terminal such as a personal security camera, a private security system, a military security camera, a military security system, a personal computer (PC), a notebook computer, a portable multimedia player (PMP), a wireless communication terminal, a smart phone, a TV application server, and a service server. The video decoding apparatus may be various devices including a user terminal such as various devices, a communication device such as a wired/wireless communication network, Communication modem to perform communication etc., various programs for inter-prediction or intra-prediction or for decoding an image, a memory for storing data, and a microprocessor for calculating and controlling by executing a program.

In addition, an image encoded into a bitstream by an encoder may be transmitted in real time or in non-real time via a wired or wireless communication network such as the internet, a local area wireless communication network, a wireless LAN network, a WiBro network, a mobile communication network, or via a cable, Universal Serial Bus (USB), and the like to an image decoding apparatus. The encoded image may be decoded and restored into an image, and then reproduced.

In general, a moving picture may be composed of a series of pictures, and each picture may be divided into a coding unit such as a block. It is to be understood that the term 'picture' described below may be replaced with other terms having an equivalent meaning such as an image, a frame, etc. The term 'coding unit' may be replaced with other terms having equivalent meanings such as a unit block, block, and the like.

Hereinafter, embodiments of the present invention will be described in detail with reference to the drawings. In the description of the present invention, duplicate descriptions will be omitted for the same components.

Figure 7:
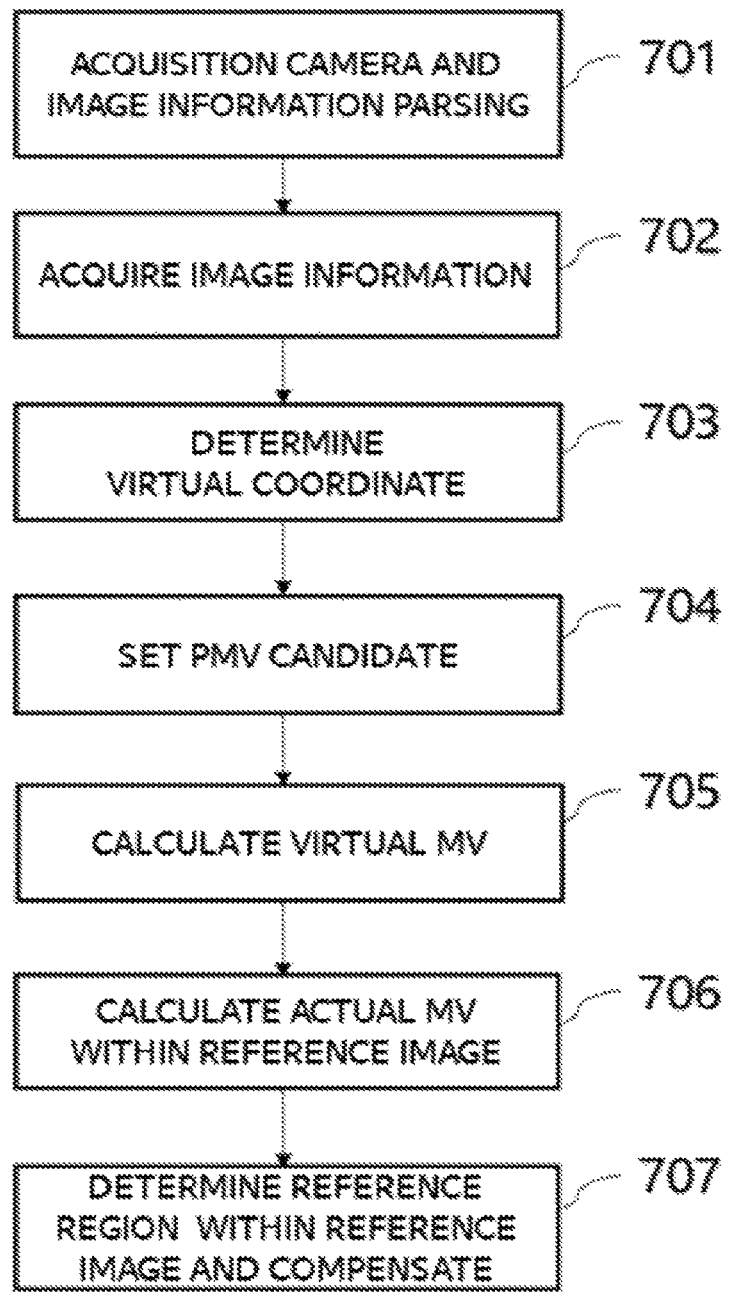
FIG. 7 illustrates a process of calculating a motion vector to perform motion compensation in an embodiment of the present invention.

FIG. 7 illustrates a process for performing motion compensation according to an embodiment of the present invention. In the embodiment of the present invention, the decoder parses information of an image acquisition camera and image information from the bitstream transmitted from the encoder (701). The information may be transmitted in a sequence unit, in an SEI message unit, or in an image group or a single image unit. The information of the camera included in the bitstream may include the number of cameras that acquire an image at the same time, a position of the camera, an angle of the camera, a type of the camera, and a resolution of the camera. The image information may include a resolution, a size, bit-depth, a projection shape, a preprocessing type, related coefficient information, and virtual coordinate-related information for the image acquired through the camera. According to the embodiment, all of the information may be transmitted. Only a part of the information may be transmitted and the other part of the information may be calculated or derived by the decoder. In addition to the above-mentioned information, information required by the decoder may be transmitted together.

Figure 3:
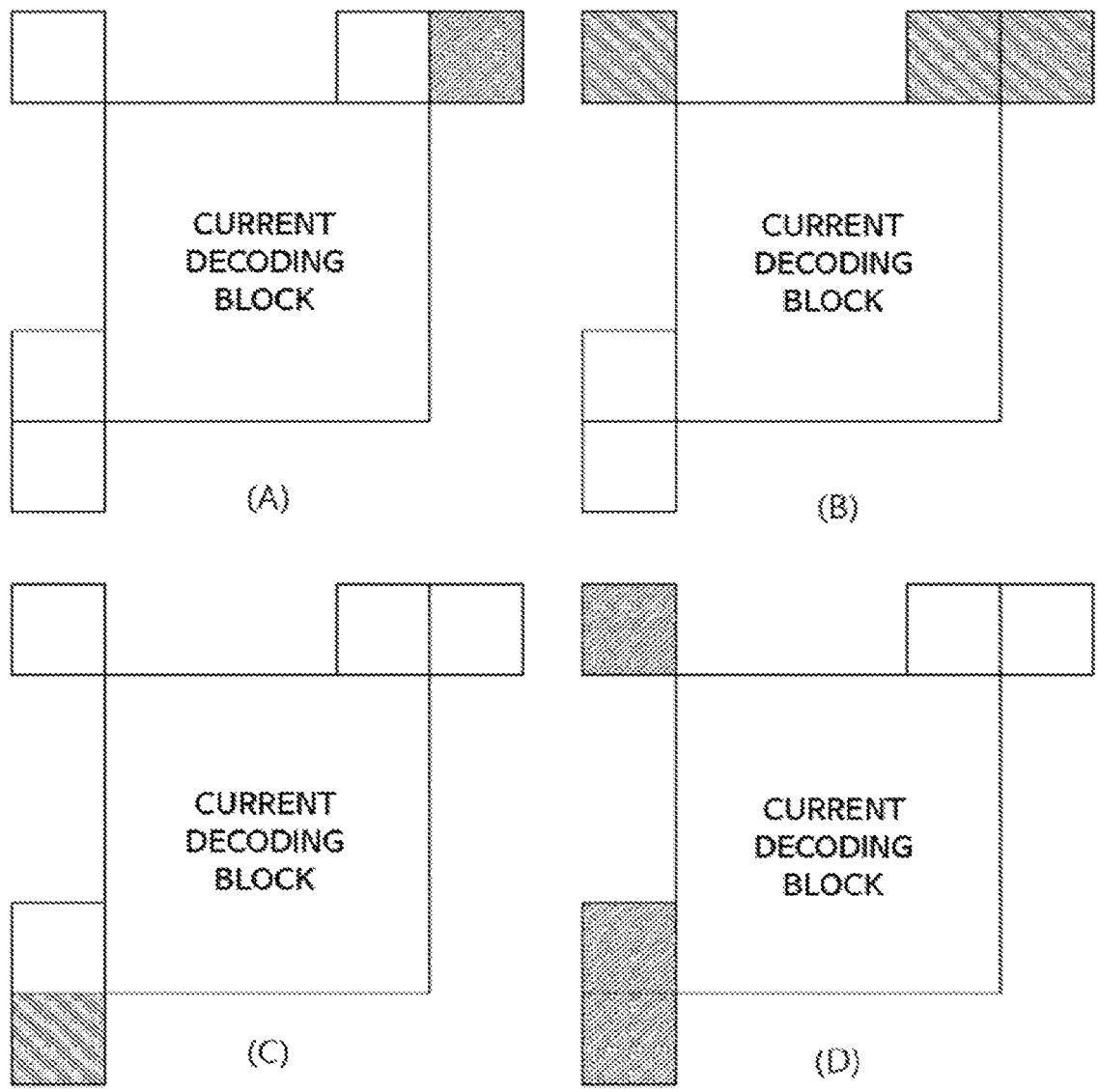
FIG. 3 is an embodiment in which there is no candidate of a predictive motion vector according to an embodiment of the present invention.
Figure 4:
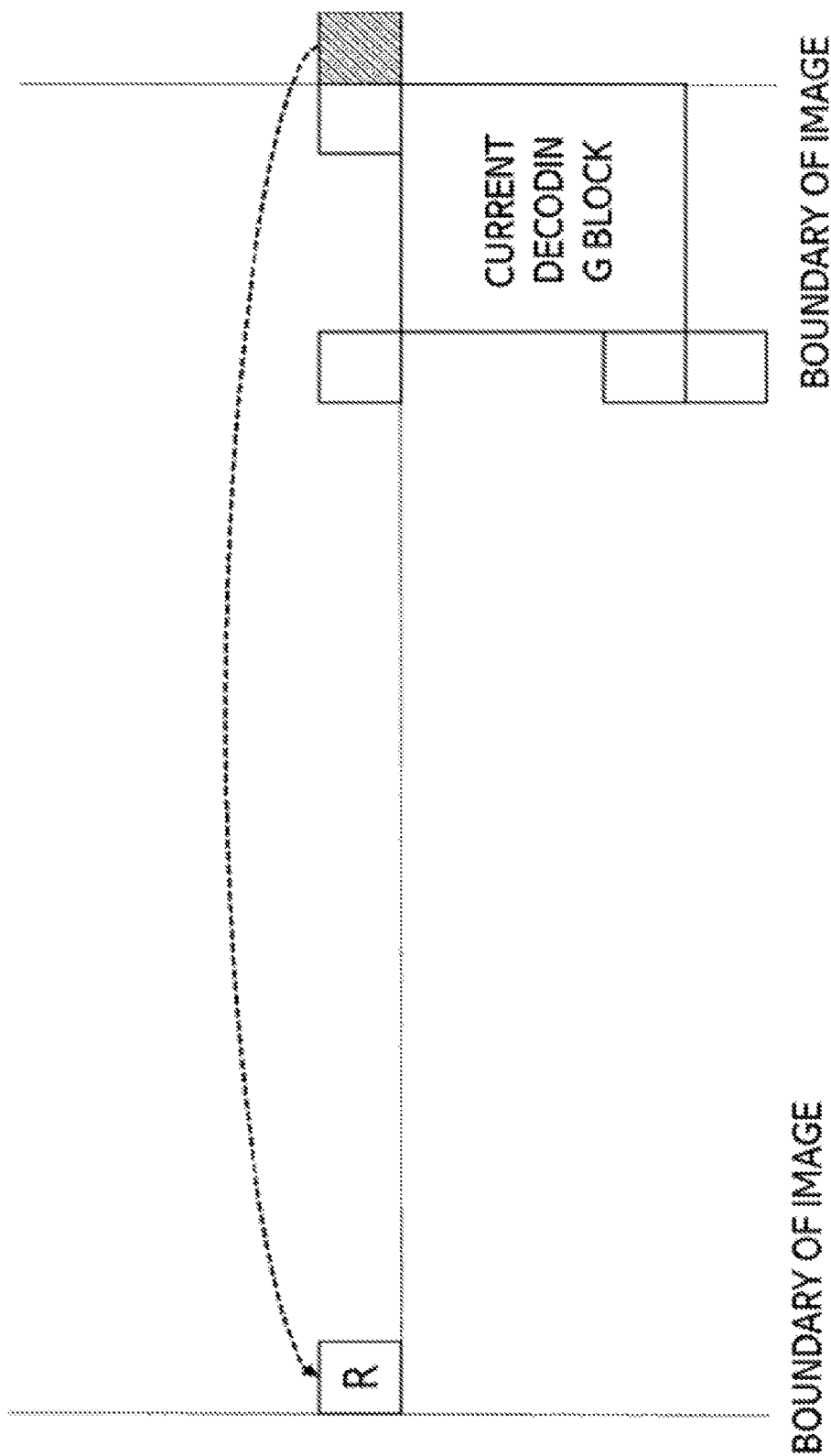
FIG. 4 illustrates a relationship between a virtual coordinate of a predictive motion vector and an actual image coordinate according to an embodiment of the present invention.
Figure 6:
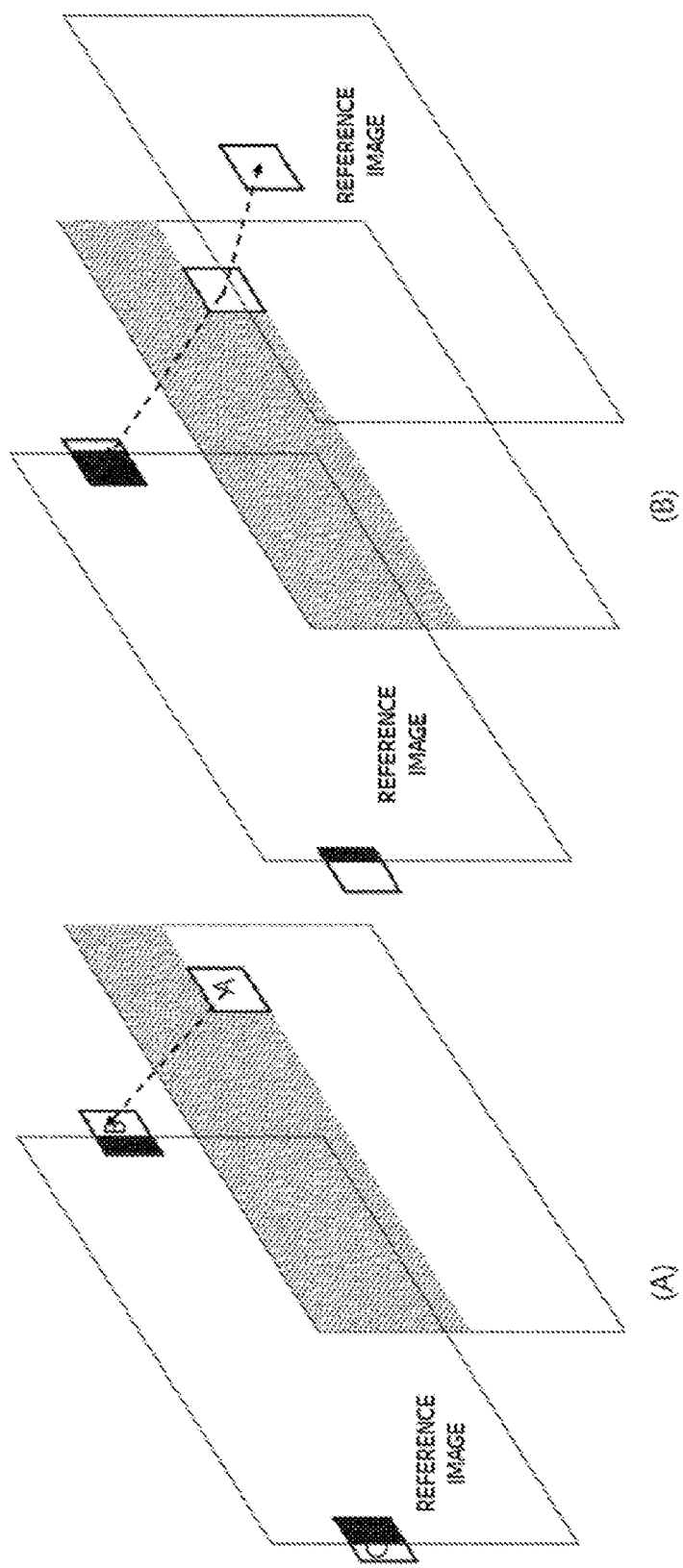
FIG. 6 illustrates a method of performing inter prediction in an embodiment of the present invention.

The decoder obtains information for decoding from the transmitted and parsed information (702). According to an embodiment, the transmitted information may be directly used as information for decoding, or the information for decoding may be derived or calculated using the transmitted information. Referring to the above embodiment, information, which is related to whether a motion vector of a block decoded at the boundary of the image opposite to the boundary block of the image described in FIGS. 3 and 4 is to be included in the candidate group when the predictive motion vector group is determined and whether the embodiments in which a reference block illustrated in FIG. 6 is divided by a picture boundary are applied, may be information transmitted or acquired through the corresponding image information. The divided blocks may exist at a boundary different from each other. The decoder determines a virtual coordinate based on the acquired information (703).

Hereinafter, embodiments of the present invention will be described in detail with reference to the drawings attached hereto, so that those skilled in the art can easily carry out the present invention. The present invention may, however, be embodied in many different forms and should not be construed as limited to the embodiments set forth herein. In order to clearly illustrate the present invention, parts not related to the description are omitted in the drawings, and similar parts are denoted by similar reference numerals throughout the specification.

Throughout this specification, when a part is referred to as being 'connected' to another part, it includes not only a case where it is directly connected but also a case where the part is electrically connected with another part and there are other devices in between. In addition, in the specification, when an element is referred to as being "comprising" an element, it is understood that the element may further comprise other elements without excluding other elements as long as there is no contrary description.

The term "~ step" or "step of ~" used in the present specification does not imply a step for ~.

Also, the terms such as first, second, etc. may be used to describe various components, but the components should not be limited by the terms. The terms are used only for the purpose of distinguishing one component from another.

In addition, the components shown in the embodiments of the present invention are shown independently to represent different characteristic functions, and it does not mean that each component is composed of separate hardware or one software constituent unit. That is, each constituent unit is described separately for convenience of explanation, and at least two constituent units of constituent units may be combined to form one constituent unit or one constituent unit may be divided into a plurality of constituent units to perform a function. The integrated embodiments and the separate embodiments of each of these components are also included in the scope of the present invention without departing from the essence of the present invention.

First, the terms used in the present application will be briefly described as follows.

The video decoding apparatus may be a device included in the server terminal such as a personal security camera, a private security system, a military security camera, a military security system, a personal computer (PC), a notebook computer, a portable multimedia player (PMP), a wireless communication terminal, a smart phone, a TV application server, and a service server. The video decoding apparatus may be various devices including a user terminal such as various devices, a communication device such as a wired/wireless communication network, Communication modem to perform communication etc., various programs for inter-prediction or intra-prediction or for decoding an image, a memory for storing data, and a microprocessor for calculating and controlling by executing a program.

In addition, an image encoded into a bitstream by an encoder may be transmitted in real time or in non-real time via a wired or wireless communication network such as the internet, a local area wireless communication network, a wireless LAN network, a WiBro network, a mobile communication network, or via a cable, Universal Serial Bus (USB), and the like to an image decoding apparatus. The encoded image may be decoded and restored into an image, and then reproduced.

In general, a moving picture may be composed of a series of pictures, and each picture may be divided into a coding unit such as a block. It is to be understood that the term 'picture' described below may be replaced with other terms having an equivalent meaning such as an image, a frame, etc. The term 'coding unit' may be replaced with other terms having equivalent meanings such as a unit block, block, and the like.

Hereinafter, embodiments of the present invention will be described in detail with reference to the drawings. In the description of the present invention, duplicate descriptions will be omitted for the same components.

FIG. 1 illustrates a decoding apparatus for performing image decoding on a block-by-block basis using division information of a block according to an embodiment of the present invention. The decoding apparatus may include at least one of an entropy decoding unit 110, an inverse quantization unit 120, an inverse transform unit 130, an inter prediction unit 140, an intra prediction unit 150, an in-loop filter unit 160, or a reconstructed image storage unit 170.

The entropy decoding unit 110 decodes the input bitstream 100 and outputs decoded information such as syntax elements and quantized coefficients. The output information includes various information for performing decoding and may include information on the image and image acquisition cameras. The image information and image acquisition information may be transmitted in various forms and units and may be extracted from a bitstream or may be calculated or predicted using information extracted from a bitstream.

The inverse quantization unit 120 and the inverse transformation unit 130 receive the quantized coefficient, perform inverse-quantization and inverse-transform, and output a residual signal.

Figure 2:
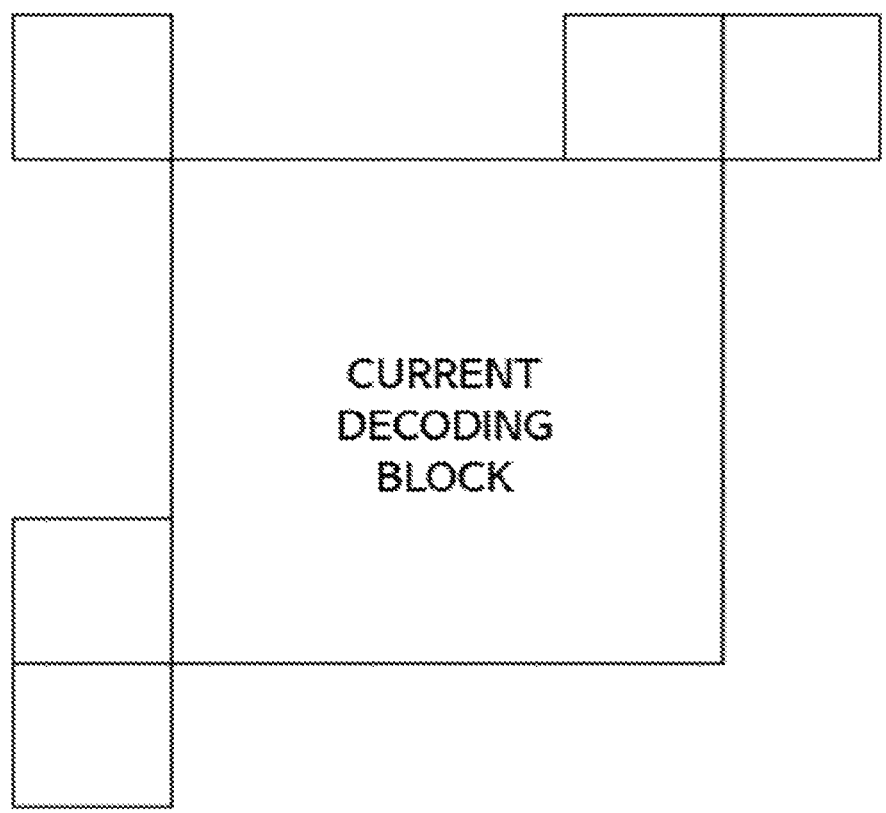
FIG. 2 illustrates a position of a neighboring block to be used as a candidate of a predictive motion vector in a motion vector prediction according to an embodiment of the present invention.

The inter prediction unit 140 calculates a motion vector using a differential motion vector extracted from the bitstream and a predictive motion vector, and generates a prediction signal by performing motion compensation using the reconstructed image stored in the reconstructed image storage unit 170. In this case, accurate prediction of the predictive motion vector may be a very important factor in efficient motion vector transmission because it can reduce the amount of differential motion vector. The motion vector of the neighboring block of the current block to be decoded are used as the candidate of the predictive motion vector as shown in FIG. 2. FIG. 2 is an embodiment of the present invention. The shape of a decoding block and the position relationship between a motion vector candidate and a current decoding block may vary according to an embodiment of the present invention. In FIG. 2, the shape of the decoding block may be a square, a non-square having an arbitrary size or a block having an arbitrary shape according to an embodiment. The motion vector candidate may be determined in various forms according to the shape of the decoding block and the coordinate within the image. The motion vector candidate may be representative of a motion vector of a neighboring block of a current block to be decoded, a motion vector of a co-located block of a reference image, a motion vector of a chrominance component corresponding to the decoding block, a motion vector of a neighboring block of a chrominance component corresponding to the decoding block, a motion vector resulting from scaling, based on a temporal position relation between a reference image and a decoding image, a motion vector of a neighboring block of the decoding block. FIG. 3 illustrates a case where there is no motion vector of a spatial neighboring block according to the position relationship of the current decoding block in the image or the characteristics of the image when constructing the predictive motion vector candidate group. In FIG. 3, a gray hatched block represents a block that does not exist or does not have a motion vector. According to the embodiment, the presence or absence of a candidate for a spatial predictive motion vector of a neighboring block may vary. FIG. 3 illustrates four embodiments. For example, if the current block to be decoded is positioned at the right edge of the image, the block with the hatched position cannot exist in the image and the motion vector cannot exist, as illustrated in FIG. 3A. In this case, a motion vector of a block in a different position may be used as illustrated in FIG. 4. As illustrated in FIG. 4, the decoding block located at the right edge of the image does not have the decoding block at the hatched position, but the decoding block at the R position exists. Therefore, the motion vector of the decoding block at the R position may also be used as the predictive motion vector candidate. The embodiment of FIG. 4 may be applied to the case of FIGS. 3 (B), (C) and (D). This is a predictable embodiment by a person having ordinary knowledge, and a detailed description thereof will be omitted. The motion vector may be calculated by obtaining the predictive motion vector through this process and adding the differential motion vector, which is transmitted through the bitstream, to the predictive motion vector. The motion compensation of the inter prediction unit 140 is performed based on the obtained motion vector and the reference image.

Like the embodiment of the present invention, the encoder may transmit the syntax including the related information to the decoder in order to use the motion vector of the block located away from the current decoding block rather than the motion vector of the neighboring block as the predictive motion vector. This transmission my be available at various levels, such as a sequence unit, a frame unit, a slice unit, a tile unit. Herein, sequence, frame, slice, and tile may be replaced with other term that denote a group of coding units. Information whether to use the embodiment of the present invention and the related information may be directly transmitted according to the embodiment, or the decoder may calculate and estimate using other information transmitted from the encoder.

The embodiment of the present invention may be equally applied not only to the determination of the predictive motion vector candidate group but also to the motion vector merging (MV merge). An merging candidate motion vector is required for motion vector merging in the encoder, and a predictive motion vector candidate group in the embodiment of the present invention may be used as a candidate group for motion vector merging. That is, in the decoder according to the embodiment of the present invention, when the current decoding block corresponds to the motion vector merging block using the same motion vector as the neighboring block, the current decoding block may be merged with one of the motion vector candidate blocks described with reference to FIG. 3 and FIG. 4. The corresponding information may be obtained from the decoder through parsing and decoding of the bitstream.

The intra prediction unit 150 generates a prediction signal of a current block by performing spatial prediction using pixel values of a decoded neighboring block adjacent to the current block to be decoded.

The prediction signals output from the inter prediction unit 140 and the intra prediction unit 150 are summed with the residual signal, and the reconstructed image generated through the summing is transmitted to the in-loop filter unit 160.

The reconstructed picture to which the filtering is applied in the in-loop filter unit 160 is stored in the reconstructed image storage unit 170 and may be used as a reference picture in the inter prediction unit 140.

Figure 5:
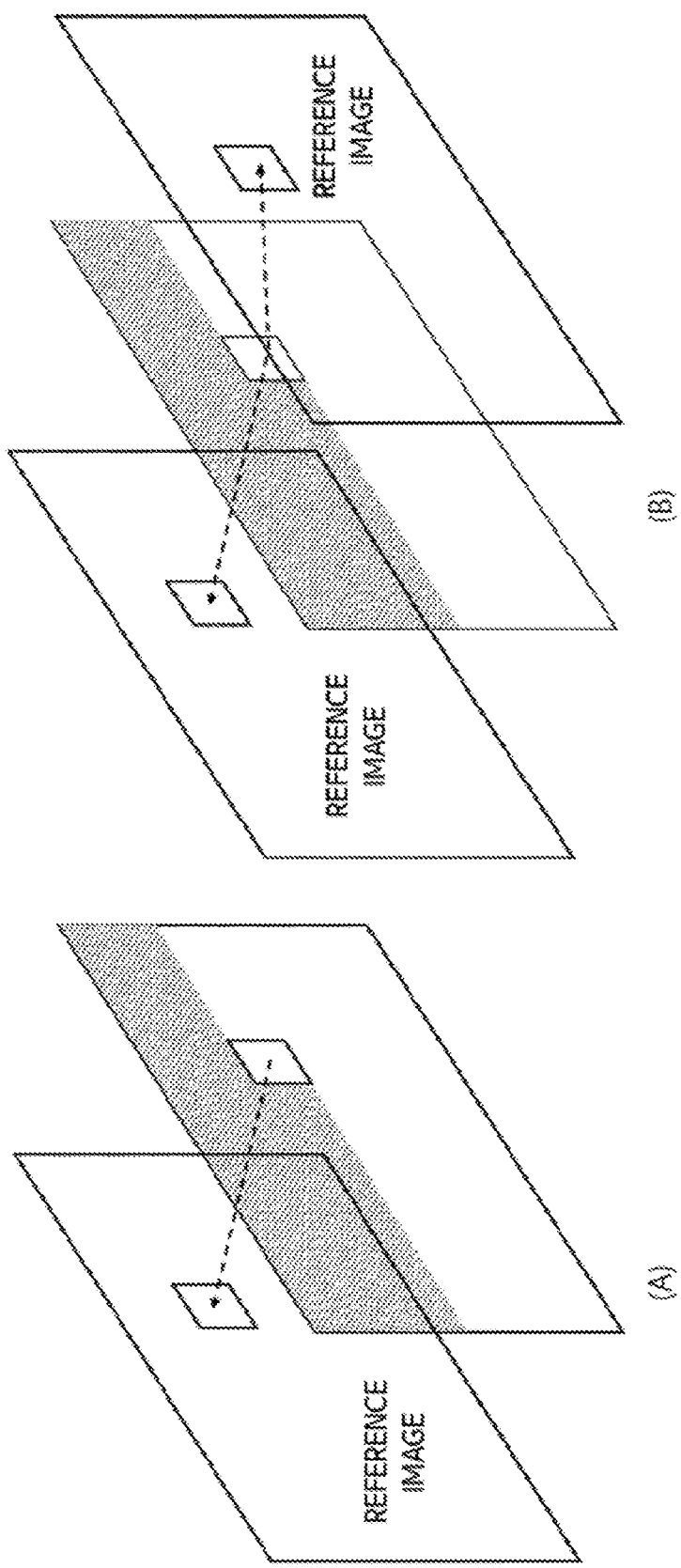
FIG. 5 illustrates a method of performing inter prediction in an embodiment of the present invention.

FIG. 5 illustrates an embodiment of motion compensation for a block applied in inter prediction. FIG. 5A shows motion compensation for a P slice when only one reference image is used, and FIG. 5B shows motion compensation for a B slice when two reference images are used. In the motion compensation for the B slice, the reference image may be one of frames which are decoded previously regardless of POC and stored in the reference image frame buffer. The related information is transmitted from the encoder to the decoder together with index information and motion information (differential motion vector, merge index, scale information, etc.) and the block may be decoded using the same. When motion compensation is performed using the predictive motion vector, the differential motion vector information or the motion vector merging information, the reference block as shown in FIG. 5 is generally located inside the reference image. In the embodiment of the present invention, the motion vector calculated for the reference between images is shown in the same form as FIG. 6. The reference block indicated by the motion vector may be referred. If the correlation between the left edge and the right edge of the image is high depending on the characteristics of the image, the encoding efficiency may be improved through the embodiment of the present invention. The regions B and C of FIG. 6 are located on both edges at different positions in the image plane, but they are blocks located at the same position in the x-coordinate. When the both edges are connected to each other, the shape becomes as shown in FIG. 8A. That is, according to the embodiment of the present invention, it is possible to perform motion compensation in a form in which both edges having high correlation are connected. If the image has a high correlation between the upper edge and the lower edge, the motion compensation may be performed in the form shown in FIG. 8B. The embodiment of the present invention may be performed regardless of the number of reference images. The embodiment of the present invention may be applied to a first case where one of the two reference blocks is referred to within the image and the other one is referred to at the image edge as shown in FIG. 6B or a second case where both reference blocks are referred to at the image edge.

Figure 8:
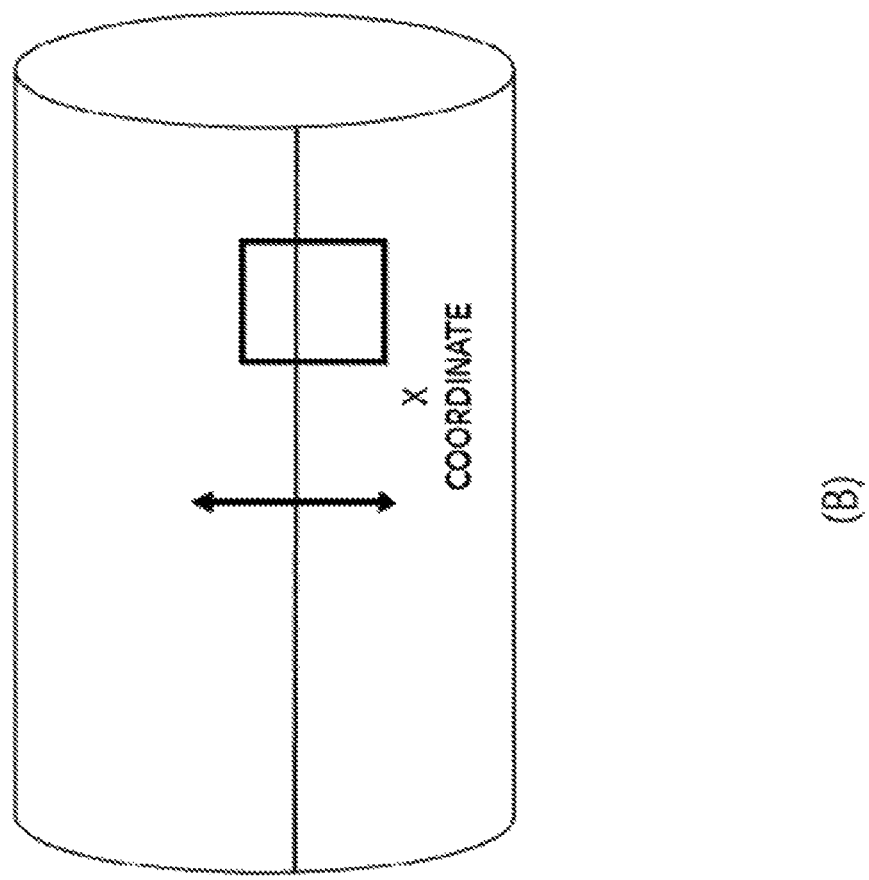
FIG. 8 is a diagram for explaining the concept of virtual coordinates in an embodiment of the present invention.
Figure 8:
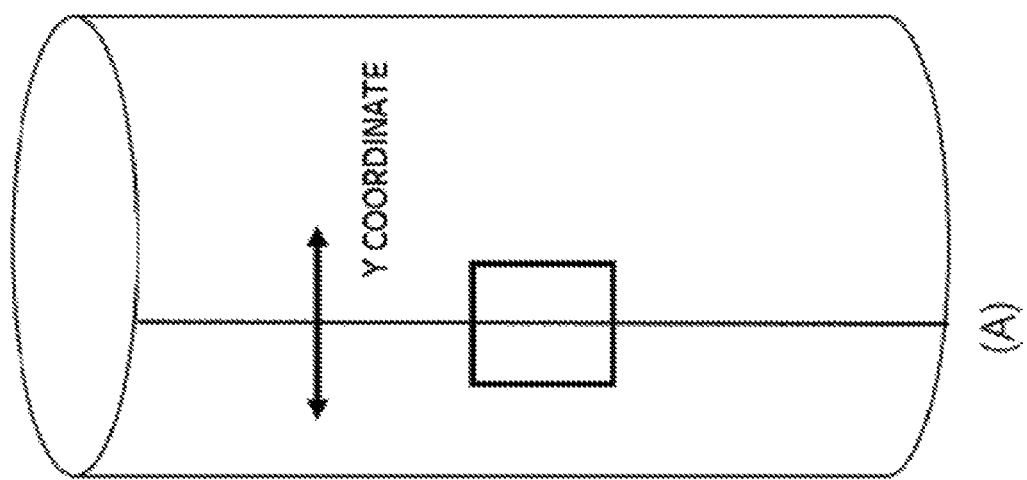

As shown in the embodiment of FIG. 8, the virtual coordinate is set by connecting the boundaries of the image each other. The boundaries of the image are connected each other to form an annular shape. The motion vector may appears beyond the boundary or across the boundary. Like FIG. 8, only one boundary may be connected to each other to have a virtual coordinate. However, depending on the type of the camera and the projection type of the image acquired in (701), they may be connected in the form of a polyhedron or a sphere and so may have complex connection boundaries. In addition, because the boundary to be connected may vary depending on the number of cameras and the type of the projection, the virtual coordinate setting may adaptively appear according to the image. If the virtual coordinate are obtained, the PMV candidate setting 704 is possible according to the virtual coordinate. The motion vector in the virtual coordinate 705 is calculated through the predictive motion vector and the transmitted differential motion vector. Then, a virtual motion vector is calculated as a motion vector in a plane image (706), and then a reference region determination and compensation is performed using the corresponding motion vector (707). If the virtual coordinate and the actual coordinate are the same, it may be performed without the virtual coordinate setting step. For the convenience of the embodiment, the motion compensation is performed by calculating MV through the virtual coordinate. However, It is possible to perform the motion vector calculation without the virtual coordinate according to the embodiment. That is, according to the embodiment, it is also possible to calculate, based on a method of converting coordinates using table mapping, the motion vector without the virtual coordinate and perform motion compensation in a reference image. Although the embodiment does not include the step of designing the virtual coordinate, the table that maps the coordinates may include the virtual coordinate design. In another embodiment, the encoder may transmit the image information including the coordinate setting or coordinate mapping table for the virtual coordinate design. The decoder may perform conversion between the actual coordinate and the virtual coordinate in the image using the coordinate mapping table transmitted from the encoder. In another embodiment, virtual coordinates or coordinates may be fixed by appointments between the encoder and the decoder and the fixed virtual coordinate value may be used. In the embodiment having a single virtual coordinate value, the decoder performs motion vector calculation and motion compensation using only predetermined virtual coordinate. When a plurality of fixed virtual coordinates are promised, the encoder may transmit information indicating the corresponding virtual coordinate to the decoder, or the decoder may obtain information relating to the virtual coordinate by predicting based on the decoded image.

Figure 9:
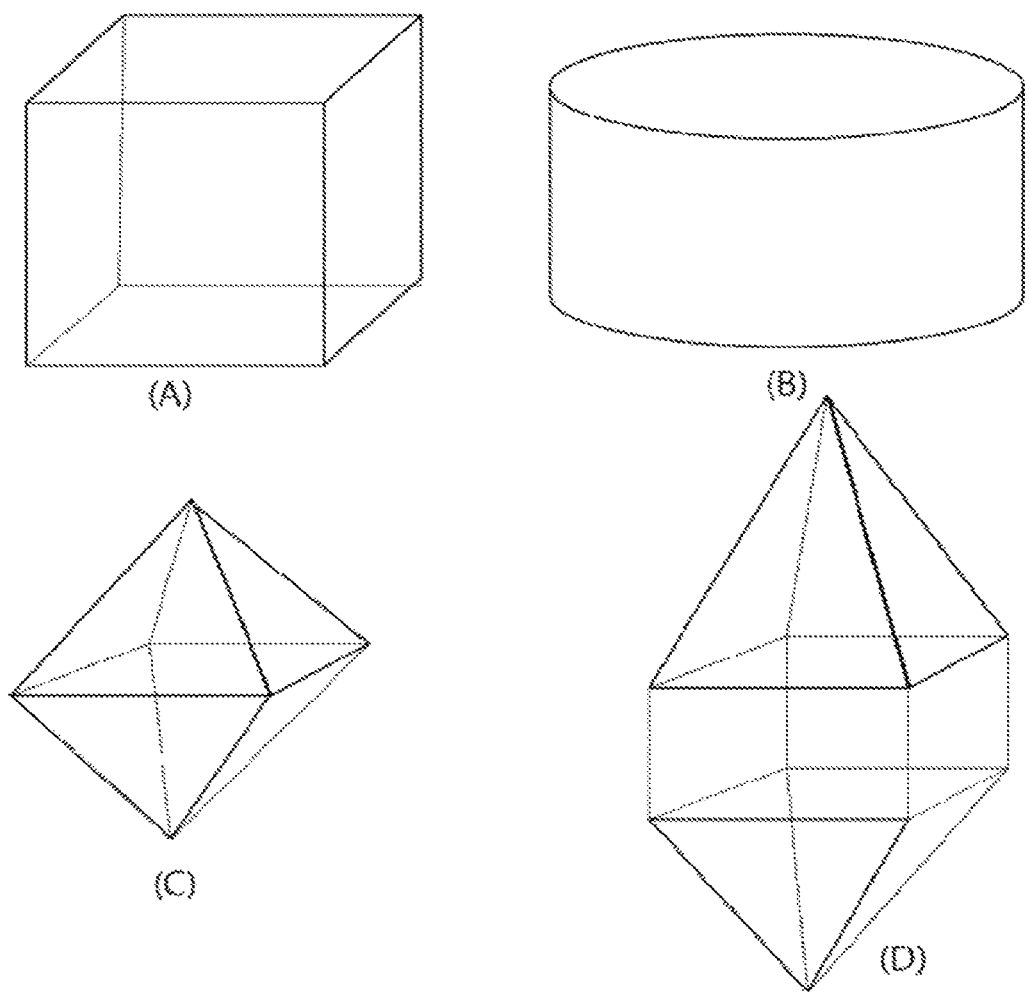
FIG. 9 illustrates various types of omnidirectional projection in an embodiment of the present invention.
Figure 10:
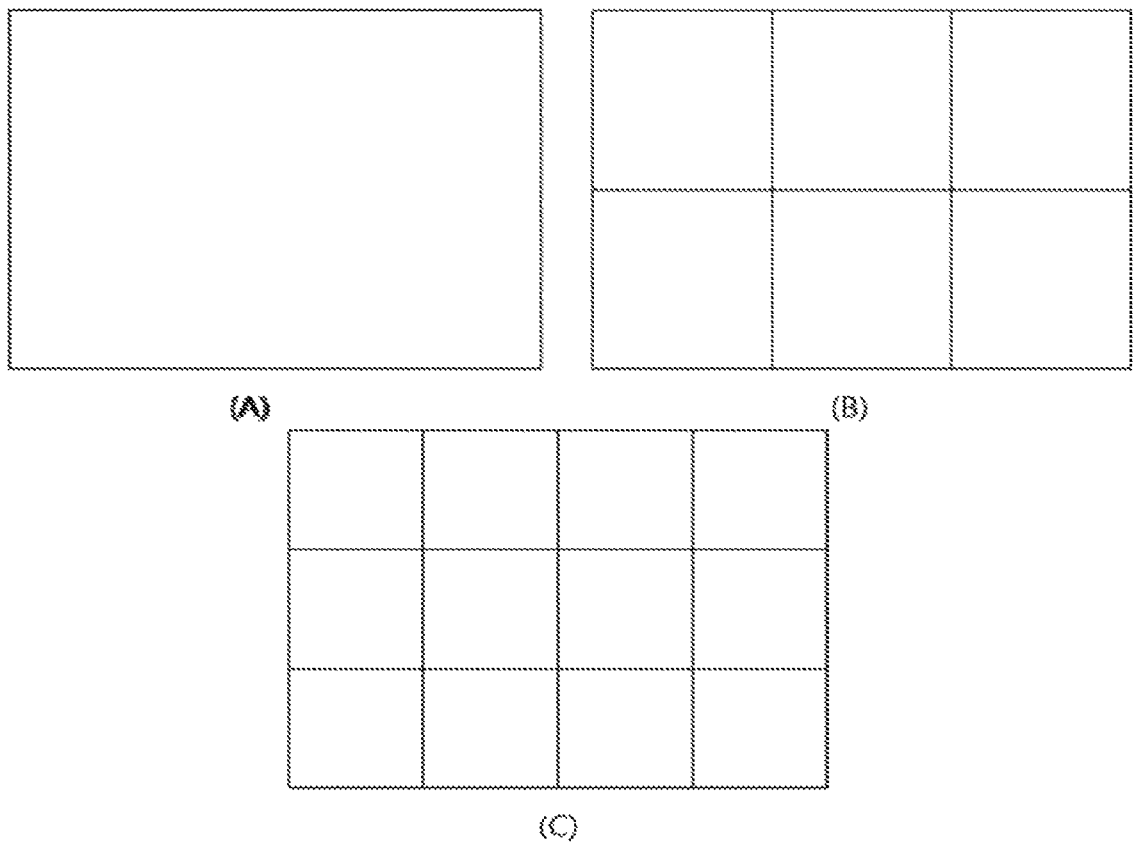
FIG. 10 illustrates a method of constructing a frame using a projected image in an embodiment of the present invention.

FIG. 9 is various embodiments in which an image of an omnidirectional camera is projected. FIG. 9A illustrates a projection onto a cube. In the embodiment, the number of sensors may be six so as to match the number of the respective projected planes, but fewer or more cases are possible. When a projection is performed with a regular hexahedron, images of six planes are generated. To compress and transmit the images, one face may be composed of one frame as shown in FIG. 10A, or one frame may be constructed and transmitted using six images. At this time, the position of the six faces in FIG. 10B may vary depending on the embodiment. In the embodiment of the present invention, since the corresponding information may be used when the virtual coordinate is set, the encoder must transmit the corresponding information to the decoder through the bitstream. The decoder may obtain the information at (701) and (702) and use it at the time of virtual coordinate design. Of course, this information may be omitted if the information is predetermined by a promise of the encoder and the decoder. The decoder may obtain the information through the promised matter even if it is not received from the encoder. FIG. 10C corresponds to an embodiment constructing the projected image into one frame in case that the image is projected onto a figure having 12 faces. The embodiment relate to a method of projecting am image or images obtained by a camera having a plurality of sensors at the same time and constructing one frame for convenience of compression and transmission. The method has various forms according to the number of camera sensors and the projection type, and may vary depending on the embodiment.

Figure 11:
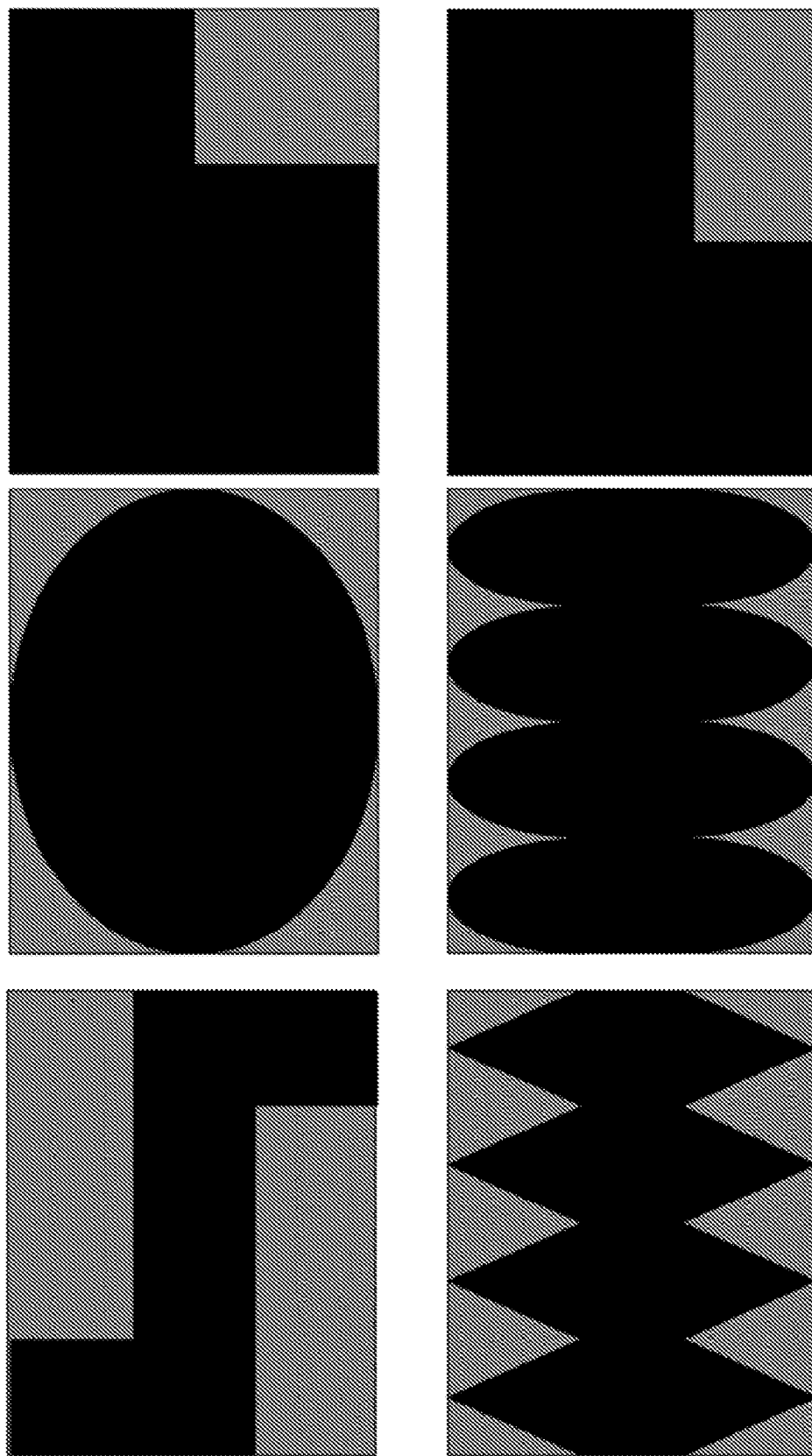
FIG. 11 illustrates a method of constructing a frame using a projected image in an embodiment of the present invention.

FIG. 11 shows another embodiment relating to a projection type and a method of constructing a frame. In FIG. 11, the black shaded portion is the portion where the acquired image is projected and the actual image data exists, and the white portion is the portion where the image data does not exist. Depending on the method of projection or the method of constructing the frame, the data may not exist in a form filled with a general rectangular frame. In this case, the encoder must transmit the corresponding information to the decoder. According to an embodiment, a white portion may be padded to form a rectangular frame, and then the frame may be encoded/decoded. Alternatively, only image data may be encoded/decoded without padding. In both methods, the encoder/decoder needs to know and use the related information. The related information may be transmitted from the encoder to the decoder, or the related information may be determined by the promise of the encoder and the decoder.

The present invention may be used in manufacturers such as broadcasting equipment manufacturing, terminal manufacturing, and industries related to original technology in video encoding/decoding related industries.

What is claimed is:

1. A method of decoding image data, the method comprising:
    acquiring, from a bitstream including a coded picture of the image data, image information of a current block in the coded picture; and
    decoding the current block based on the image information,
    wherein decoding the current block comprises:
    constructing a motion vector candidate list, the motion vector candidate list including a plurality of motion vector candidates;
    determining a motion vector of the current block based on the motion vector candidate list and index information, the index information specifying one of the plurality of the motion vector candidates;
    generating a prediction signal of the current block by performing a motion compensation on the current block based on the determined motion vector; and
    reconstructing the current block by summing a residual signal of the current block and the prediction signal, the residual signal being acquired from the bitstream, and
    wherein the motion vector candidate list includes a motion vector of a pre-decoded block which is not adjacent to the current block and belongs to the same coded picture as the current block.

2. The method of claim 1, wherein the motion vector candidate list further includes a motion vector of a spatial neighboring block adjacent to the current block.

3. The method of claim 2, wherein the motion vector candidate list further includes a motion vector of a temporal neighboring block of the current block, and
    wherein the temporal neighboring block is representative of a co-located block in a reference picture.

4. The method of claim 3, wherein determining the motion vector of the current block comprises:
    selecting, based on the index information, one of the motion vector candidates in the motion vector candidate list;
    deriving a predictive motion vector of the current block based on the selected motion vector candidate; and
    determining the motion vector of the current block by using the predictive motion vector and a differential motion vector of the current block.

5. A method of encoding image data, the method comprising:
    encoding a current block in a coded picture of the image data,
    wherein image information of the current block is encoded into a bitstream,
    wherein the bitstream includes the coded picture of the image data,
    wherein encoding the current block comprises:
    constructing a motion vector candidate list, the motion vector candidate list including a plurality of motion vector candidates;
    determining a motion vector of the current block based on the motion vector candidate list; and
    generating a residual signal of the current block by subtracting a prediction signal of the current block from an original signal of the current block, the prediction signal being obtained by performing a motion estimation on the current block based on the determined motion vector,
    wherein index information specifying one of the plurality of the motion vector candidates is encoded into the bitstream, and
    wherein the motion vector candidate list includes a motion vector of a pre-encoded block which is not adjacent to the current block and belongs to the same coded picture as the current block.

6. A device for storing a bitstream associated with an image data,
    wherein the bitstream includes a coded picture of the image data,
    wherein image information of a current block in the coded picture is acquired from a bitstream,
    wherein the current block is decoded based on the image information, wherein the image information includes index information specifying one of a plurality of motion vector candidates in a motion vector candidate list, wherein the motion vector candidate list is constructed based on a motion vector of a spatial neighboring block adjacent to the current block, wherein the motion vector candidate list includes a motion vector of a pre-decoded block which is not adjacent to the current block and belongs to the same coded picture as the current block, wherein the motion vector candidate list and index information are used to determine a motion vector of the current block, and wherein the motion vector of the current block is used to generate a prediction signal of the current block through motion compensation.

\* \* \* \* \*